(12) United States Patent
Nicholson (10) Patent No.: US 9,189,211 B1
(45) Date of Patent: Nov. 17, 2015

(54) METHOD AND SYSTEM FOR TRANSCODING DATA

(75) Inventor: Charles Nicholson, San Francisco, CA (US)

(73) Assignee: SONY COMPUTER ENTERTAINMENT AMERICA LLC, Foster City, CA (US)

(*) Notice: Subject to any disclaimer, the term of this patent is extended or adjusted under 35 U.S.C. 154(b) by 704 days.

(21) Appl. No.: 12/827,329

(22) Filed: Jun. 30, 2010

(51) Int. Cl.
*G06F 9/45* (2006.01)

(52) U.S. Cl.
CPC ... *G06F 8/41* (2013.01); *G06F 8/51* (2013.01)

(58) Field of Classification Search
None
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,528,265 A | 6/1996 | Harrison | |
| 6,157,368 A | 12/2000 | Faeger | |
| 6,375,572 B1 | 4/2002 | Masuyama | |
| 6,504,554 B1* | 1/2003 | Stone et al. | 715/760 |
| 6,526,569 B1* | 2/2003 | Obin et al. | 717/140 |
| 6,826,716 B2* | 11/2004 | Mason | 714/38.1 |
| 7,240,327 B2* | 7/2007 | Singh et al. | 717/108 |
| 7,263,722 B1* | 8/2007 | Luo et al. | 726/26 |
| 7,346,897 B2* | 3/2008 | Vargas | 717/137 |
| 7,590,863 B2* | 9/2009 | Lambert | 713/189 |
| 7,730,468 B1* | 6/2010 | Trowbridge | 717/148 |
| 2002/0085097 A1 | 7/2002 | Colmenarez et al. | |
| 2003/0070159 A1* | 4/2003 | Webb | 717/116 |
| 2003/0237080 A1* | 12/2003 | Thompson et al. | 717/161 |
| 2004/0039926 A1* | 2/2004 | Lambert | 713/189 |
| 2004/0103405 A1* | 5/2004 | Vargas | 717/137 |
| 2004/0181783 A1* | 9/2004 | Nagata et al. | 717/137 |
| 2004/0212589 A1 | 10/2004 | Hall et al. | |
| 2004/0250238 A1* | 12/2004 | Singh et al. | 717/108 |
| 2006/0136880 A1* | 6/2006 | Sone et al. | 717/136 |
| 2006/0174230 A1* | 8/2006 | Drayton et al. | 717/136 |
| 2009/0113445 A1* | 4/2009 | Sakashita et al. | 719/313 |
| 2009/0164973 A1* | 6/2009 | Barnett et al. | 717/110 |
| 2011/0083118 A1* | 4/2011 | Moore | 717/110 |

OTHER PUBLICATIONS

George, D., et al., Programming Language Inter-conversion, International Journal of Computer Applications (0975-8887), vol. 1—No. 20, 2010, [retrieved on Jul. 2, 2015], Retrieved from the Internet: <URL:http://www.ijcaonline.org/journal/number20/pxc387619.pdf>.*

Hogenson, G., Foundations of C++/CLI: Chapter 13—Interoperability, 2008, pp. 383-422, [retrieved on Jul. 2, 2015], Retrieved from the Internet: <URL: http://link.springer.com/chapter/10.1007/978-1-4302-1024-5_13#>.*

Bolt, R.A., "Put-that-there": voice and gesture at the graphics interface, Computer Graphics, vol. 14, No. 3 (ACM SIGGRAPH Conference Proceedings) Jul. 1980, pp. 262-270.

DeWitt, Thomas and Edelstein, Phil, "Pantomation: A System for Position Tracking," Proceedings of the $2^{nd}$ Symposium on Small Computers in the Arts, Oct. 1982, pp. 61-69.

* cited by examiner

*Primary Examiner* — Thuy Dao
*Assistant Examiner* — Geoffrey St Leger
(74) *Attorney, Agent, or Firm* — Frommer Lawrence & Haug LLP; William S. Frommer (57) ABSTRACT

Method and apparatus and computer program code for cross programming language transformation. This transcoding permits automation of a video game asset conditioning process by using introspection and reflection capabilities of high level tool languages to generate optimally-packed, platform-specific binary memory images as well as the code, such as C++ to read the images.

32 Claims, 8 Drawing Sheets

METHOD AND SYSTEM FOR TRANSCODING DATA

BACKGROUND

1. Field of the Invention

This invention relates generally to a method and system for transcoding data. More particularly, the present invention relates to transcoding computer program code from a first language to a second language.

2. Background Discussion

Typically, when developing software, such as for a video game, multiple computer languages are used in developing complicated program packages. In such environments, conversions among these multiple computer languages are required to generate desired program code, such as the program code for the video game. These multiple computer languages typically include three types of languages:

1. a high-level language, such as Java or C# (typically used for producing content);
2. a low-level language, such as C or C++ (typically used for executing the produced contents); and
3. an intermediate language, such as XML (typically used for transmitting codes or data through a network).

Typically, conversion among these three types of computer languages is conducted manually. For example, a programmer takes one type of program code in one language and rewrites that program code into a different programming language and compiles the rewritten program code. Such a conversion is time consuming and prone to errors and inconsistency, as it requires the programmer to manually translate one language to another.

SUMMARY

Thus, the present invention is directed to a system and method for transcoding data. Specifically, embodiments of the present invention are directed to methods and apparatus and computer program code for cross programming language transformation. This transcoding permits automation of a video game asset conditioning process by using introspection and reflection capabilities of high level tool languages to generate optimally-packed, platform-specific binary memory images as well as the code, such as C++ to read the images.

This invention reduces a tedious time-consuming, and expensive task of conditioning to a simple step of processing data in one language and passing it off to the system for automated serialization, instead of having to straddle languages or agree on a data format. The content provider, such as a game developer, or programmer, simply needs to prepare his/her content in a high level language, specify a target architecture (such as PLAYSTATION2™, PLAYSTATION 3™, PSP™, or other platform), and the system according this invention automatically completes the process using transformation, as described herein.

One embodiment of the present invention is directed to a system (the system) that includes a database that receives a plurality of first program code, each first program code utilizing a descriptive programming language. A code generator generates a second program code that utilizes a procedural programming language based on the first program code. A conditioning unit generates platform-specific runtime data associated with the first program code used in the code generator. A terminal executes the second program code and the platform-specific runtime data and produces output data.

Another embodiment of the present invention is directed to the system described above wherein the descriptive programming language includes, for example, C#, or Java.

Yet another embodiment of the present invention is directed to the system described above wherein the procedural programming language includes, for example, C or C++.

Yet another embodiment of the present invention is directed to the system described above wherein the code generator reads the first program code as data.

Yet another embodiment of the present invention is directed to the system described above wherein the code generator generates the second program code using an introspection function of the descriptive programming language.

Yet another embodiment of the present invention is directed to the system described above wherein the code generator generates the second program code using a reflection function of the descriptive programming language.

Yet another embodiment of the present invention is directed to the system described above wherein the code generator transcodes each class used in the first program code into a structure in the second program code according to a predetermined conversion.

Yet another embodiment of the present invention is directed to the system described above wherein the second program code includes read-only data.

Yet another embodiment of the present invention is directed to the system described above wherein the conditioning unit includes a conditioning instance module.

Yet another embodiment of the present invention is directed to the system described above and also includes a memory image generator.

Yet another embodiment of the present invention is directed to the system described above wherein the conditioning unit conditions a plurality of assets for a game.

Yet another embodiment of the present invention is directed to the system described above wherein the conditioning unit conditions tool data for the game.

Yet another embodiment of the present invention is directed to the system described above wherein the memory image generator receives conditioned data from the conditioning unit and generates a memory image according to a platform of the terminal.

Yet another embodiment of the present invention is directed to the system described above wherein the memory image includes binary data.

Yet another embodiment of the present invention is directed to the system described above wherein the code generator and the conditioning unit implement functions using C# language.

Yet another embodiment of the present invention is directed to the system described above wherein the terminal includes a PSP™ device or a PS3™ device.

Yet another embodiment of the present invention is directed to the system described above and further includes Unicode attributes to change the transcoding process.

Other embodiments of the present invention include the methods described above but implemented using apparatus or programmed as computer code to be executed by one or more processors operating in conjunction with one or more electronic storage media or electronic memory or storage module. The computer program steps may be stored on an electronic storage medium or computer readable medium or non-transitory computer readable medium that can be executed by one or more processing devices. Furthermore, the above described embodiments are a process and the products of the process are also embodiments of the present invention.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media. This electronic storage media may include, for example a non-transitory electronic storage medium/media such as a register, or other electronic repository or electronic storage location for data.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

Game Development

Game development is a software development process by which a video game is produced. For early games, relatively simple games, a single programmer could handle almost all the tasks of developing a game. However, the requirements of modern commercial games far exceed the capabilities of a single developer and require the splitting of responsibilities. A feature of modern commercial games is that the game includes extensive game contents, also known as game assets or game tool data, which include characters, tools, landscapes, texture, animation, music, script, and dialogue. Typically, large-scale commercial games are created by development teams. The development team may work for years to complete a sophisticated video game.

A development team may consist of many members including, for example, designers, visual artists, sound engineers, programmers, and etc, each of whom perform a predetermined task. A game designer designs game play, the rules and structure of a game, game's narrative and dialogue. A game artist, typically, creates video game art, which may be 2D oriented or 3D oriented. Sound engineers are technical professionals responsible for sound effects and sound positioning. The sound engineers may also oversee voice acting and other sound asset creation. A game programmer typically develops video games or related software (such as game development tools). Game programmers usually produce design tools for the designers to use. This eliminates the need for designers to access or modify game code.

The contents created by the team members are referred to as game assets or game tool data. Game assets include characters, models, textures, materials, sounds, animations, kinematics, scripts, tools, landscapes and so forth used in a game. Game assets produced by a particular program are stored in an intermediate format such as XML (Extensible Markup Language) format and then transmitted to a server to be conditioned. The XML format includes a human-readable text format. All the required game assets are prepared before a game is executed by a game console or game engine. The process of preparing game assets is referred to as game asset conditioning. During the conditioning process, assets might be converted, optimized, transformed, or combined, but are output in the format that will be shipped with the final version of the game. The conditioned game assets are suitable for playback or execution and are read directly by the game console in their final format, which requires no further interpretation or transformation.

As stated above, the present invention is directed to an apparatus and a method for automatically transcoding a first code in a first computer language into a second code in a second computer language. For example, when runtime types are described in an XML file, an embodiment of the invention transcodes a family of object descriptions into an XML code into a code of a lower computer language such as C or C++. Another embodiment of the invention transcodes a compiled set of C# code into a code of a lower computer language such as C or C++. The present invention improves accuracy and efficiency of such a transcoding.

An embodiment of this invention uses the introspection and reflection capability of high-level languages, such as C# and/or Java for automatically converting C# or Java code to C or C++ code for runtime code. This invention further relates to integration between the conversion and the game asset conditioning process.

Figure 1:
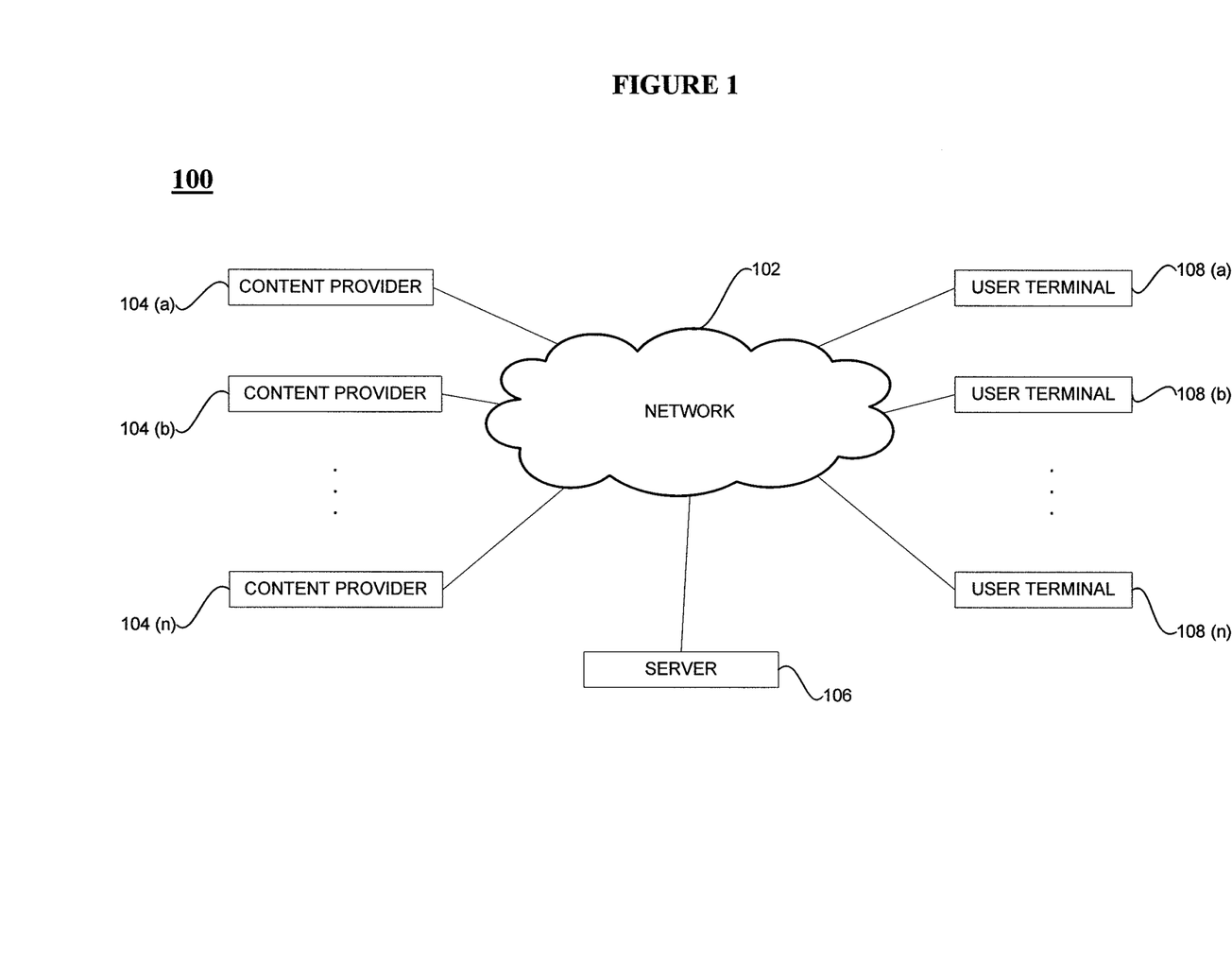
FIG. 1 illustrates an example of a network that supports embodiments of the present invention.

FIG. 1 illustrates an example of a network system 100 that supports embodiments of the present invention. The system 100 shown in FIG. 1 includes a network 102, a plurality of content provider modules 104(a) ... 104 (n) (where "n" is any suitable number), a server module 106, and a plurality of user terminals, or modules 108(a) ... 108(n) (where "n" is any suitable number).

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The content provider modules, or facilities, or units 104(a) ... 104 (n) (generally referred to as 104, herein) are typically computers, such as computers, or other processing devices such as a desktop computer, laptop computer, personal digital assistant (PDA), wireless handheld device, PLAYSTATION™, PLAYSTATION2™ PLAYSTATION3™ PSP™ and the like. They may be capable of processing and storing data themselves or merely capable of accessing processed and stored data from another location (i.e., both thin and fat terminals).

The content provider modules 104 prepare and/or provide program codes and/or game assets and then transmit the codes and/or game assets (described above in relation to GAME DEVELOPMENT) to the server module 106, typically via network 102, or other transmission mechanism to provide electronic program code and/or game assets to server module 106 or an intermediate location or storage medium or database. For example, each member of the development team may work at a different one of the plurality of content provider modules 104, such that portions of the game may be generated at separate remote locations and provided to content module 106.

The server module, or facility, or unit, 106 is typically one or more processors with associated memory, such as computers, or other processing devices such as a desktop computer, laptop computer, personal digital assistant (PDA), wireless handheld device, PLAYSTATION™, PSP™ and the like. They may be capable of processing and storing data themselves or merely capable of accessing processed and stored data from another location (i.e., both thin and fat terminals).

The content provider modules 104 submit game assets and/or codes of a game to the server module 106. The server module 106 receives game assets and/or codes from the content provider 104 and converts the codes to runtime codes and/or game data that are suitable to be executed by the user terminal 108. The server module 106 further generates runtime data using the received game assets. The runtime data is generated according to the requirements in the runtime code. The user terminal 108 executes the runtime code and runtime data so that a user plays the game. The server module 106 is described in more detail in relation to FIG. 2.

The user terminal, or module, or facility 108(a) ... (n) (generally referred to as 108, herein) typically include processing devices and memory and an output display, such as a GUI and include computers, or other processing devices such as a desktop computer, laptop computer, personal digital assistant (PDA), wireless handheld device, PLAYSTATION™, PSP™ and the like. They may be capable of processing and storing and displaying data themselves or merely capable of accessing processed and stored data from another location (i.e., both thin and fat terminals) and displaying the accessed or retrieved data.

Upon a request from a user to play a game, the server module 106 creates executable codes, generates a memory image using required game assets, and then transmits both to the user terminal 108. The user terminal 108 runs the executable codes and the memory image and allows playing the game or outputting the data received from server module 106.

Content provider modules 104, server module 106, and user terminals 108 are coupled to network 102 via an associated bi-directional communication medium, which may be for example a serial bus such as IEEE 1394, or other wire or wireless transmission medium. The content provider module 104, server module 106, and the user terminal 108 may be communication appliances, or user locations, or subscriber devices, or client terminals.

Figure 2:
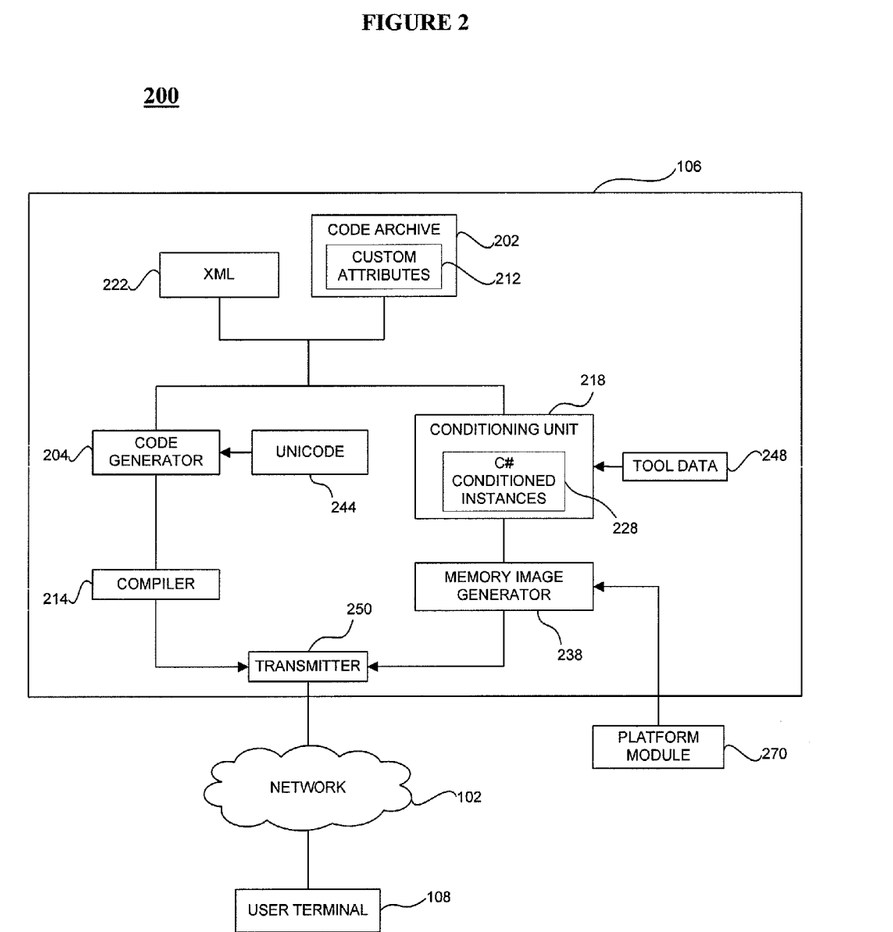
FIG. 2 illustrates an example of a system according to an embodiment of the present invention.

FIG. 2 illustrates an example of a system 200 according to an embodiment of the present invention. The server module 106 is coupled to network 102, which is coupled to user terminal 108. Other user terminals 108(b) ... (n) and content modules 104 are shown in FIG. 1; but are not shown in FIG. 2. Platform module 270 is shown coupled to memory image generator module 238. Alternatively, the platform module may be coupled to conditioning unit 218 to provide platform data.

The server module 106 includes a code archive module 202, an XML module 222, a code generator module 204, a Unicode attribute module 244, a compiler module 214, a conditioning unit 218, tool data module 248, Memory Image Generator (MIG module) 238, and transmitter module 250.

Code archive module 202 is a storage module that accesses, retrieves and/or stores the descriptions of the types contained in the game data. These classes that define the types of game data are typically stored in archives compiled from the C# program language, JAVA™ language, or other language that has reflection and/or introspection capabilities. The code archive 202 may be, for example a DLL (Dynamic Link Library) that is an executable file that acts as a library of executable functions or data that can be used by an application, such as WINDOWS™. A DLL typically provides functions and a program that accesses the provided functions by creating either a static or dynamic link to the DLL. (A static link remains constant during program execution while a dynamic link is created by the program as needed.) Using DLLs provides a number of advantages such as: saves memory; reduces swapping; saves disk space; makes upgrades easier; provides after-market support; supports multi-language programs; and eases the creation of international versions.

The code archive module 202 also includes a custom attribute module 212, which is shown as a memory module, electronic storage medium, or plug-in module with memory and/or processing functionality, that is used to store custom attributes. Attributes in this case are simply custom language-specific (e.g., C#/Java) markup, that are first-class components of the programming language. They allow users to annotate actual code with metadata. The attribute module may also be an integral component of the programming language that the code archive module was compiled from, that can drastically increase the flexibility of the entire pipeline. When, in the MIG (memory image generator) or the code generator component, a custom attribute is detected, a custom plugin can be given control to do domain-specific work. This lets users customize almost any part of the code/image generation process. These custom attributes provide a method of associating declarative information with C# code (types, methods, properties, and other parameters). Once a custom attribute has been associated with a program entity, the attribute can be queried at run time and used in any number of ways. The custom attributes stored in module 212 are used to store the instance of any data type in metadata. Data from the code archive module 202 is provided to the code generator module 204 and the conditioning unit 218.

The XML module 222 is a module that typically includes XML data that includes, for example, the definition of a class. The XML module 222 may be for example, an XML schema. The XML language typically defines a class and then includes instances of the class. The definition of a class illustrates a name of the class and all the attributes of the class. The XML module 222 further allows a user to customize attributes of a class. The definition portion of a class or a plurality of class in XML language may be regarded as an XML database. It is noted that the XML database does not require the actual data of a class. In other words, the XML database does not require values of all the fields.

The XML data is typically provided to the XML module 222 from the content provider 104 (shown in FIG. 1). Furthermore, the XML module 222 typically includes objects with customized attributes, which are allowed by the XML language. As a customized attribute is not a standardized attribute, a conversion rule needs to be designed for the conversion of these customized attributes.

Data from the XML module 222 is provided to the code generator module 204 and the conditioning unit 218.

The code generator unit, or module, 204, which may also utilize C# language, transcodes a first code, received from either the code archive module 202 or the XML module 222, to a second code that includes the same functions as the first code. The first code typically utilizes C# and cannot be used efficiently by a game console, or user terminal, 108 to execute a game, while the second code is typically C++ or C and is suitable to be used by the game console, or user terminal, 108 to execute the game. Thus, for example, the code generator module 204 provides a C# program that receives, for example, as input data another C# program (i.e., from the DLL) or XML (i.e., from XML module 222) and generates as output, C++ code that represents runtime game data. An introspection function and/or a reflection function of the C# language is used for the conversion. The second code generated by the code generator 204 is read-only.

Reflection is a feature of high-level programming that allows an application to query its own data, such as metadata. Reflection allows an application to discover information about itself so that it may display this information to the user, modify its own behavior by using functions such as late binding or dynamic invocation (i.e., binding to and calling methods while a program is executing, (runtime)), or create new data types at runtime. Reflection is typically used in high-level programming languages, such as SMALLTALK™ and scripting languages.

Unicode attribute module 244 is a memory module, or electronic storage medium or storage/processing module that is used to store unicodes, which are typically a uniform manner to represent characters as integers, associated with the program code from the code archive module 202 or XML module 222. While ASCII (American Standard Code for Information Interchange) uses 7 bits for each character, a unicode representation uses 16 bits for each character. Thus, using unicodes permits representation of more than 65,000 unique characters. This substantial representation capacity is useful when programming for languages, such as Greek, Chinese and Japanese.

Unicodes that are stored in Unicode attribute module 244 are used to override the program code of the code generator module 204. For example, unicodes may be used to display a "pause warning" in different languages when a computer game is played in different countries such as U.S.A. Japan, and China. A pause screen may be a very short "pause" display in English, however, the representation in the Chinese language may be more sophisticated characters. For example, using unicodes, a class "PauseScreenText," is defined in XML,     class PauseScreenText
    {
    [Unicode] string m_pauseText;
    int m_pauseTextX;
    int m_pauseTextY;
    };

The definition defines attributes of the class "PauseScreenText", including a warning text (m_pauseText, string), a horizontal displaying position of the text (m_pauseTextX, integer), and a vertical displaying position of the text (m_pauseTextY, integer). The definition further shows that the attributes are coded using "Unicode" format. This means that when the program identifies the language that needs to be used, the program can translate the warning text accordingly. The instances of this class are associated with each language. For example, for each language, the value of "m_pauseText" needs to be changed.

The compiler module 214 is used to store program code or a computer program or set of programs that transforms, or translates source code that is written in a program language (source code) into another computer language (the target language, often having a binary form, object code).

While the code generator unit 204, Unicode attribute module 244 and compiler 214 have been described as separate units, or modules, or facilities, it is also an embodiment of the present invention that the code generator 204, Unicode attribute module 244 and compiler 214 could be combined into a single processing/memory module such that they can share data and processing and storage functions.

Furthermore, it is an embodiment of the invention that the Unicode attribute module 244 is excluded when unicodes are not used.

Furthermore, it is an embodiment of the invention that the code generator 204 is coupled to the XML module 222 and the code archive module 202 and performs the code generation function. This code is then provided to the compiler module 214 that then produces runtime game code (shown in FIG. 3) and provides the runtime game code to transmitter 250. It is also an embodiment of the present invention that all the modules are performing their functions in parallel with the functions of all other modules.

The conditioning unit 218 receives data from either the code archive module 202 or the XML module 222 and loads the tool data from tool data module 248, which may also include game assets. The conditioning unit 218 creates code archive instances from the tool data. This function is a transformation of the tool data, since the tool data may not resemble the game data, using C# program language. The conditioning unit 218 maps all the game assets according to requirements in the second code and the game assets and outputs the organized game assets to the memory image generator 238. These organized game assets are also named as "conditioning instances." As the conditioning instances (module 228) are prepared according to the game requirements or XML data, they can be used for multiple platforms that run the same games without further modifications.

As stated in the game development portion, development team members may use different programming languages or software that is suitable or desirable based on their programming skills and/or task requirements. The various programming languages and software include, for example, Photoshop, C, C++, Java, and C#. The engineers or artists for designing game characters or dialogue may prefer to use Java and C#, which is user-friendly and rapidly deployed. A programmer for designing a game engine or other executable codes may prefer C or C++, which has a desirable control of hardware resources. Therefore, a conversion is required to prepare all the game assets and codes to be executed by the game console. For example, a conversion of a code that is written in XML needs to be transcoded in C or C++ to be read during an execution of the game. A conversion of a code that is written in Java or C# is also needs to be transcoded into C or C++ to be executed during runtime.

The conditioned instances module 228 may be a part of the conditioning unit 218. This conditioned instance module 228 is used to facilitate the conditioning process. This includes, for example, populating the data and utilizing the tool data received from tool module 248.

The memory image generator 238 is operatively coupled to the conditioning unit 218 to receive the conditioned instances. The memory image generator 238 also obtains platform information from platform module 270, which indicates an architecture of the platform of the user terminal 108, and the memory image generator 238 generates a memory image consistent with the desired architecture. The memory image generated by the memory image generator 238 is optimally-packed and platform-specific. The memory image is in a binary format. The memory image generator 238 transforms the XML intermediate data into binary runtime data that the generated C/C++ code can natively run. The memory image is generated according to the architecture of a specific platform. For example, if a platform requires a 64 bit memory image, then the 64 bit memory image generated for this platform can not be used by another platform that requires a 32 bit memory image. The memory image is generated to satisfy additional criteria, such as endianess, hierarchies, CPU off-loading mechanisms, and multiprocessing. The memory image generator unit 238 produces runtime game data, which is shown in more detail in relation to FIG. 4 herein. The runtime game data, produced from the memory image generator 238, is typically in binary format.

Furthermore, it is an embodiment of the invention that the conditioning unit 218, tool data 248 and memory image generator 238 could be a single module. While FIG. 2 shows them as three separate modules, the functions could be combined in a single unit or facility. It is also an embodiment of the present invention that all the modules are performing their functions in parallel with the functions of all other modules.

The transmitter 250 receives the executable code from the compiler 214, which is typically read-only runtime game code and the runtime game data from the memory image generator 238 and transmits them to the user terminal 108, typically via network 102. The terminal 108 is a terminal that executes the runtime game code and the platform-specific runtime game data to produce output data, which may be for example, a video game.

Figure 3:
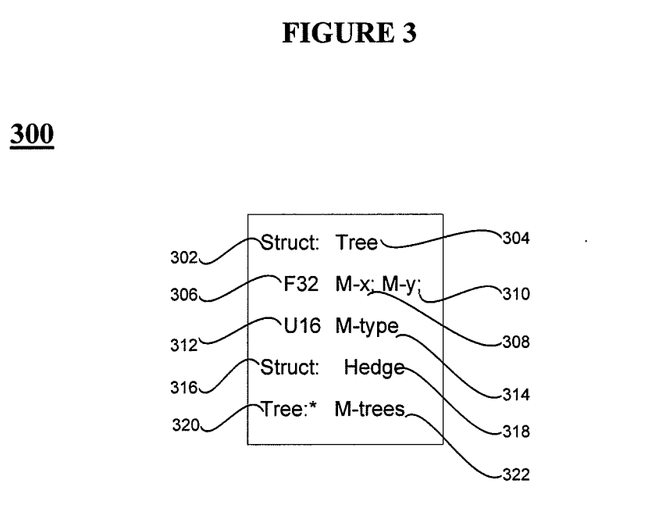
FIG. 3 illustrates an embodiment of runtime code according to an embodiment of the present invention.

FIG. 3 shows an example of runtime game code 300 that is produced by code generator 204. This game code is typically read-only code, which may be in C++, that is compiled by compiler 214.

For example, a computer game may require a line of 10 trees with gradually increasing heights. To achieve this, a structure that includes a class, "Tree", is defined. The XML code can be written as follows:

class Tree {string m_name; int m_x; int m_y; int m_height;}

The class "Tree" includes the following attributes: a name (m_name, string), a horizontal displaying position in a screen (m_x, integer), a vertical displaying position in a screen (m_y, integer), and a height of the tree (m_height, integer). It is noted that the definition does not require any value of the attributes. A name of the attribute is adequate for the definition. But, the class can have many instances. For example, 10 instances of the class "Tree" includes Tree1, Tree2, . . . , Tree10. Each instances are in a different position. The actual data for these instances show that each of the m_name, m_x, m_y, and m_height has a specific value for each instances.

As stated above, FIG. 3 illustrates an example 300 of the second code.

Struct (302): Tree (304)
F32 (306) M-x (308); M-y(310);
U16 (312) M-type (314);
Struct (316) Hedge (318)
Tree *(320) M-trees (322).

The example defines a structure, "Tree", in the second code such as C++. The user terminal reads instances of the structure, "Tree", included in the memory image according to the code in FIG. 3.

Figure 4:
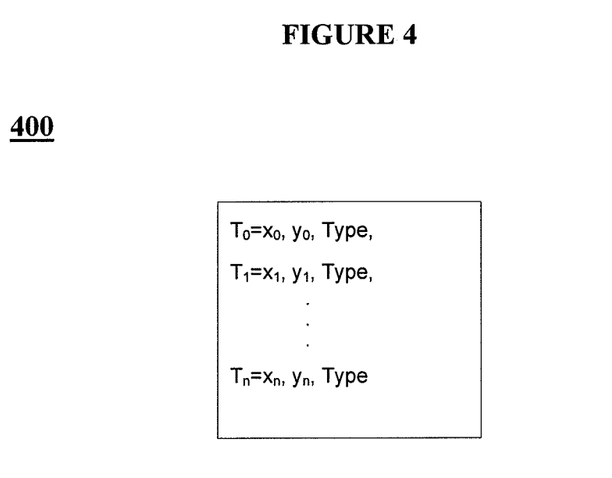
FIG. 4 illustrates an embodiment of runtime data according to an embodiment of the present invention.

FIG. 4 illustrates an example 400 of the output from the memory image generator (FIG. 2, element 238). This data is referred to as a memory image map. This map is runtime game data that is in binary form.

$T_0 = x_0, y_0,$ Type,
$T_1 = x_1, y_1,$ Type

. . .

$T_n = x_n, y_n,$ Type

FIG. 4 illustrates the instances of class "Tree" included in the memory image data. These instances are created in C++. As the code in FIG. 3 illustrates, the C++ for the structure "Tree", the user terminal would not mistake reading the memory image if the code in FIG. 3 is available.

Figure 5:
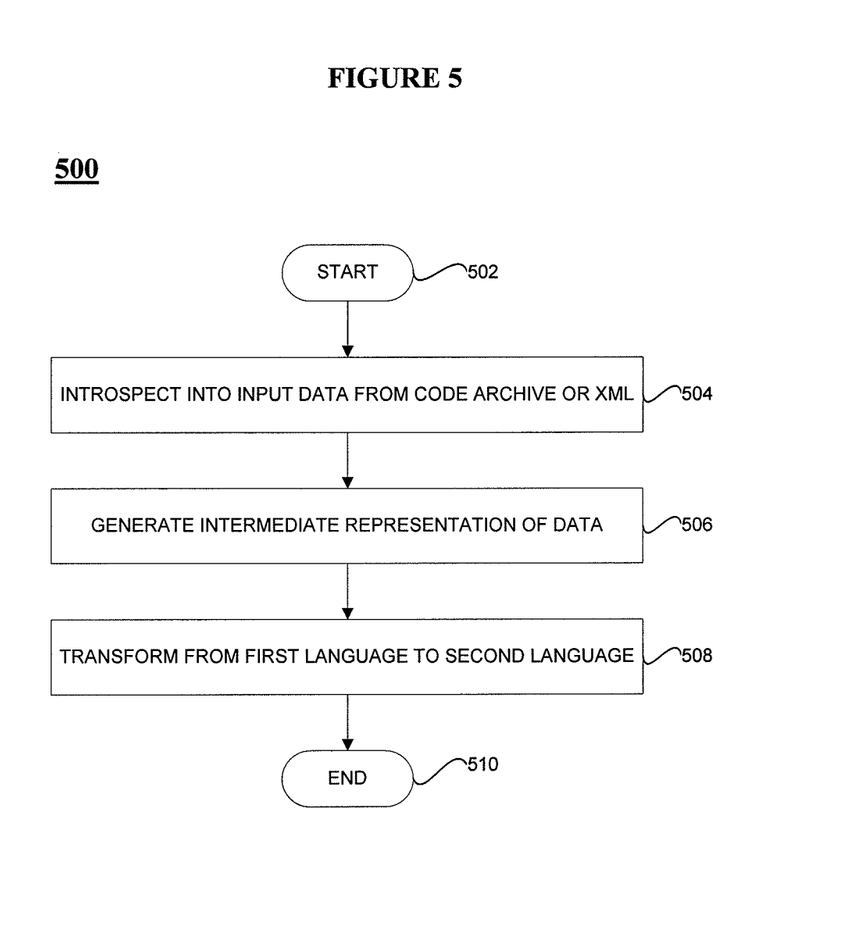
FIG. 5 illustrates an embodiment of program for a code generator module according to an embodiment of the present invention.

FIG. 5 illustrates an embodiment 500 of program code for the code generator (FIG. 2, element 204) to implement functionality. As discussed previously, the code generator is implemented by utilizing a C# computer language. As shown in FIG. 5, start step 502 begins the process.

Step 504 shows that introspection into the input data is performed. An introspection property of C# is used for the transcoding. The introspection property of C# allows C# to review the program (input data from either code archive module or XML module) as data rather than an executable program and obtains attributes of a class or an object during runtime. For example, introspection permits the code generator to identify objects that hold the data. Data for a hedge may include definitions for a tree in the hedge that have an "x", "y" and height value. Instances of the tree may be "2", "3" and 20 feet, which populate the definitions.

Step 506 shows that an intermediate representation of the input data is generated. This intermediate representation includes transcoding that converts each "class" declared in the first code and the customized attributes into a "structure" or a "class" in the second code. A default conversion table illustrates a one-to-one correspondence between a class in the first code and a structure in the second code. A user may manually change the correspondence according to the user's preference.

The following table illustrates an example of the default conversion.

| First code | Second code |
| --- | --- |
| (int) System.Int32 | I32 |
| (uint) System.UInt.32 | U32 |
| (byte) System.Byte | char |
| (float) System.Single | F32 |
| (double) System.Double | F64 |
| (string) System.String | char* |
| System.Byte[ ] | char* |

The C++ generator uses an introspection function of C# to introspect into a code or an XML schema to identify all the classes in the code or the XML. A counter is used to count all the classes. The C++ generator further identifies a definition of a class and all the attributes of the class. The C++ generator generates an intermediate data that represents a conversion of classes and attributes.

Step 508 shows that the C++ generator transforms the second code by combining the intermediate date with other data in the XML schema, such as metadata or comments. The C++ generator literally copies the metadata and comments into the converted code.

The following is an example of the transcoding a class:
The first code is written in C#.
Class exampleClass
{
public int x;
public string y;
public float[ ] z;
}
After transcoding, the second code is written in C++.
struct ExampleClass
{
I32 x;
char* y;
float* z;
U32 z_count;
};

The conversion generate C++ header (.h) file per C# class. This header file contains the C++ transcoding of the C# class. Each C# class becomes a C++ structure that contains the fields. All array forms become C++ pointers to the transformed type payloads, along with a counter variable. Default C++ type selection is overridden via user-supplied C# attributes.

The C++ generator can also be implemented by utilizing a reflection property in the C# language. Alternatively, it can be implemented by utilizing Java. Alternatively, it is can be implement by any computer language that includes an introspection or reflection property similar to C# or Java.

Step 510 shows an end step.

Figure 6:
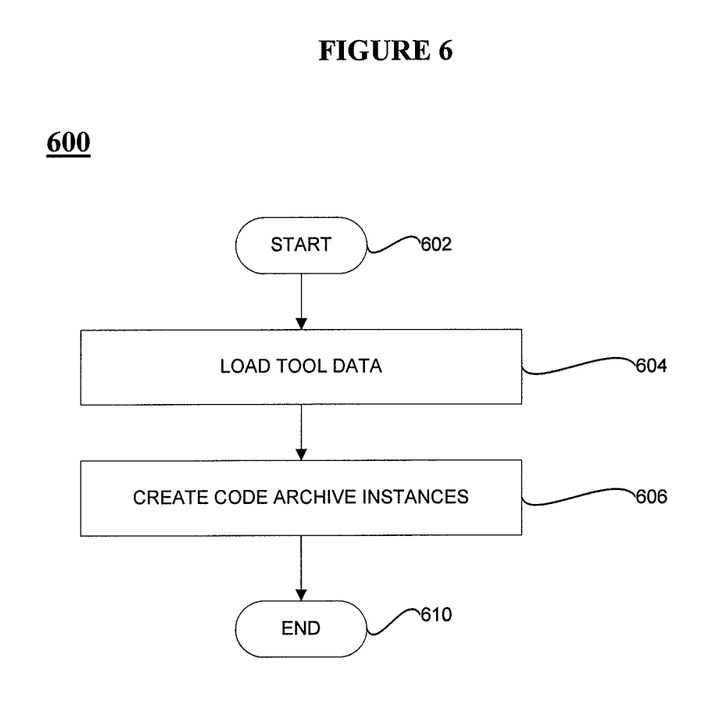
FIG. 6 illustrates an embodiment of program code for a conditioning unit according to an embodiment of the present invention.

FIG. 6 illustrates an embodiment 600 of program code for the conditioning unit (FIG. 2, element 218) to implement functionality. Step 602 is a start step. Step 604 shows that the conditioning unit loads tool data according to the requirements of the code received from the database. This tool data is provided by tool data module 248 shown in FIG. 2. Step 604 may also be viewed as a loading step.

Step 606 shows that the conditioning unit then generates code archive instances from the tool data, which was loaded in step 604. Step 606 may be viewed as a transforming step.

Step 610 is an end step.

Figure 7:
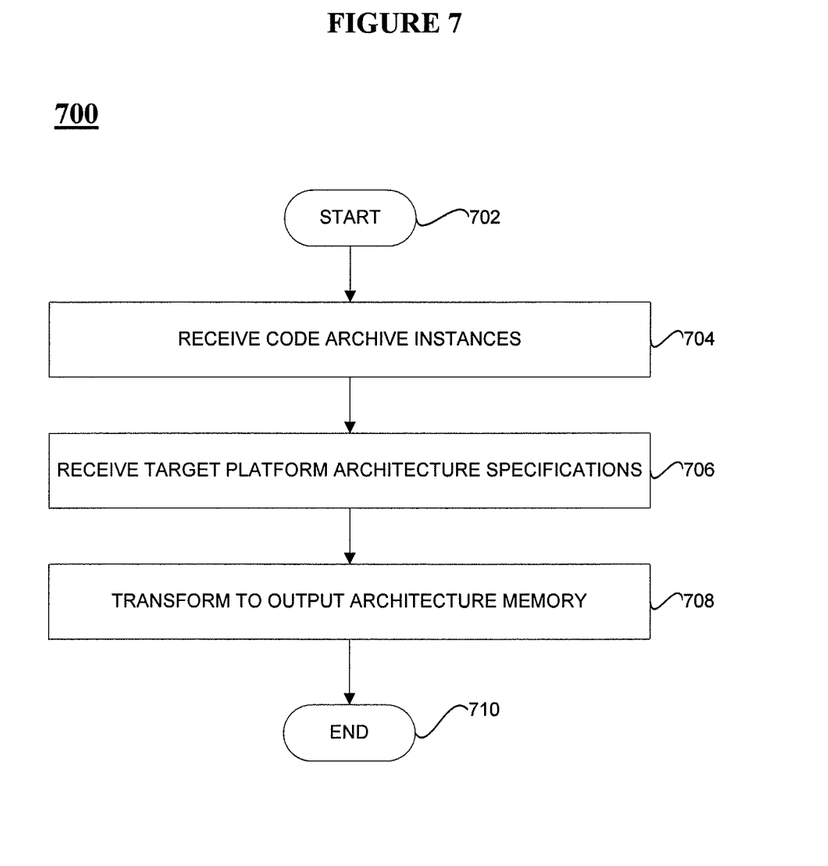
FIG. 7 illustrates an embodiment of program code for a memory image generator according to an embodiment of the present invention.

FIG. 7 illustrates an embodiment 700 of program code of the memory image generator (shown in FIG. 2 as element 238), to implement its functionality. Step 702 is a start step. Step 704 shows that the memory image generator receives the code archive instances, including game assets and tool data.

Step 706 shows that the memory image generator obtains target platform information. The platform information represents architecture specifications such 64 bit or 32 bit, little or big endian. (The platform information may be provided, for example, by platform module shown in FIG. 2 as element 270.)

Step 708 shows a transformation of the received data to output architecture of the memory layout. This output memory image is a binary representation of runtime game data.

Step 710 is an end step.

Figure 8:
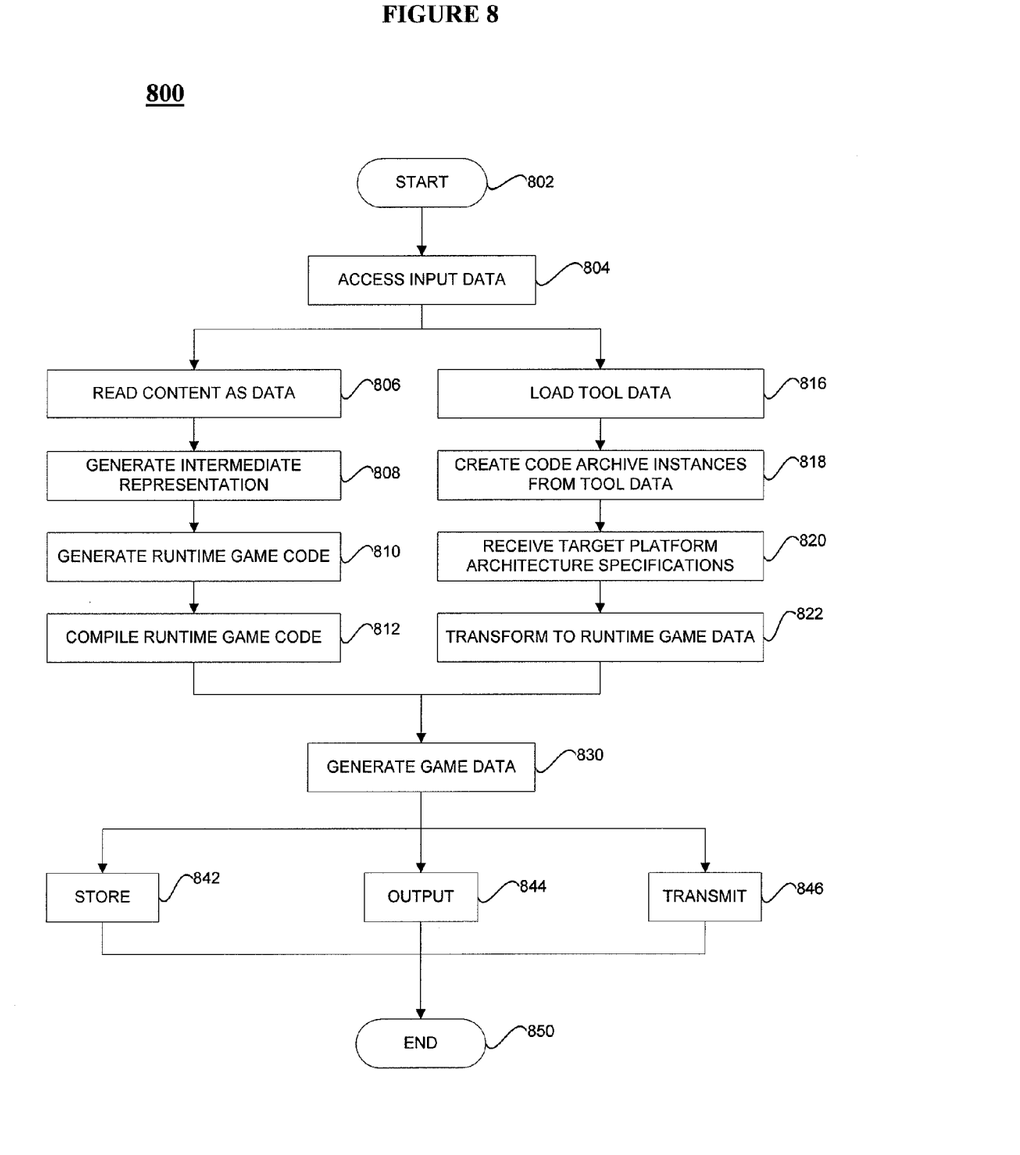
FIG. 8 illustrates a series of operational steps of an embodiment of the present invention.

FIG. 8 illustrates an embodiment 800 of the operation of the invention. FIG. 8 is shown as a flowchart of steps. These steps may be stored on one or more electronic medium. Each step may be written and/or stored as a separate module, or portion of code, or alternatively, steps may be combined and written as code for multiple steps.

Step 802 shows a start step. Step 804 shows that input data is accessed. This data may be either a DLL, or XML data and includes metadata, that is received or accessed and represents first program code. This program code is typically in a descriptive language, such as C#, JAVA, or XML, and is typically an extensive set of content, such as game assets that are not suitable to be used in the game in the form of the DLL or XML. This data, including the metadata, is typically authored, or provided by a game programmer and has introspection and reflection capabilities. This data, while including extensive game assets, does typically not provide flexibility to be used with a non-specified platform.

Step 806 shows that the content is read as data. This is typically performed by the code generator, as described herein, that uses the introspection and reflection capabilities of a high level language such as the descriptive program language (XML, C#, JAVA) to generate a low-level code that knows how to interpret the data. The use of introspection and reflection permits generation of an intermediate representation, such as C# code, JAVA, or object oriented data that is a description of the data (step 808). The intermediate representation looks at each class, each field.

Step 810 shows that the intermediate representation, in for example, C# language, can be transformed into a second program code that utilizes a procedural programming language based on selected one or more of the first program code. This transcoding includes converting each class used in the first program code (descriptive language) into a structure in the second program code according to a predetermined conversion. This second program code is, for example C, or C++ code that is read-only runtime game code (shown in FIG. 3).

Step 812 shows that the runtime game code is compiled and used to generate game data, which is game executable data.

Steps 804, 806, 808, 810 and 812 can be described as definitions in that these steps define the executable game code that is combined with instances, which are described in relation to steps 816, 818, 820 and 822.

Step 816 shows that tool data is loaded. This tool data is typically data that is generated in a language that needs to be converted into another language. The tool data is typically types of data, such as a description of a tree having an "x", "y" and height that describes instances of the tree.

Step 818 shows that instances of the tool data are created. These instances are also based on the code archive data (step 804). Thus, the instances generated in step 818 are based on the description of an asset (tool data) and code archive data (e.g., XML). The processing of step 818 shows that all instances of the tool data are converted into a type of instance. The result of this transformation is a set of instances. The transformation is performed irrespective of the target architecture.

Step 820 shows that target platform architecture specifications, such as 32 bit, 64 bit, little endian, big endian, etc., are received.

Step 822 shows that the code archive instances, generated in step 818 are combined with the target platform architecture specifications to produce, or transform, the data to runtime game data. This platform-specific runtime data is associated with the first program code used in the code generation step 810. This transformation is accomplished using the introspection and reflection capabilities of a high level language to automate the creation of the platform-specific memory image. This memory image is typically in binary format and may be described as runtime game data.

The runtime game data, or image data, or image map is typically re-usable and edits or revisions may be accomplished by using metadata attributes.

The runtime game data and runtime game code are combined to generate game data, as shown in step 830. This combination processing may be performed by a terminal, such as a computer, PLAYSTATION™, PSP™ that executes the runtime game data and runtime game code to produce output data, which may be a videogame.

The output data, such as a video game may be stored in a memory, output to a user, or terminal or display apparatus or transmitted to a remote location, as shown by steps 842, 844 and 846, respectively.

End step 850 shows that the process is complete.

Figure 9:
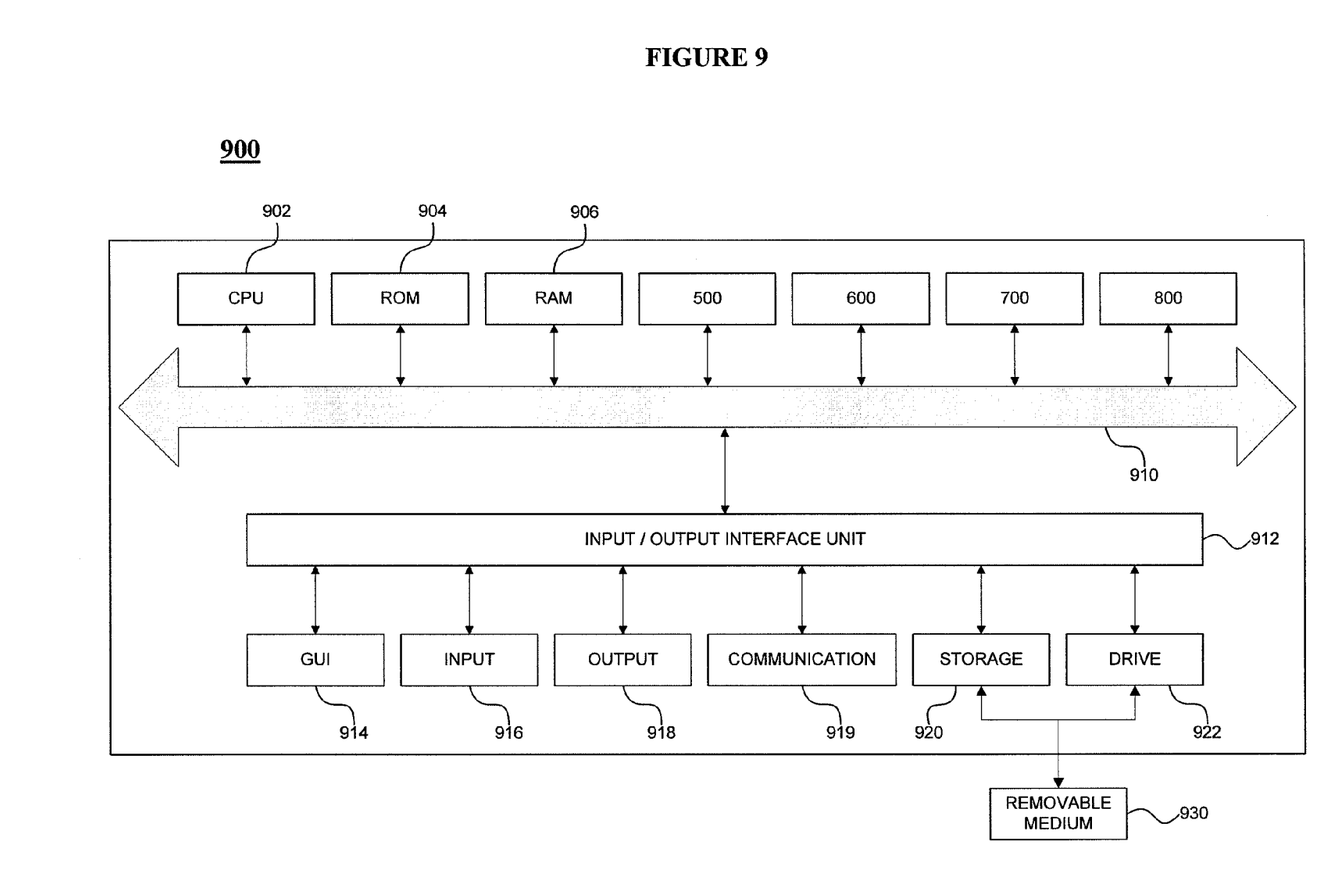
FIG. 9 shows a processing module configured to support various embodiments of the present invention.

FIG. 9 shows an example 900 of a processor module that supports various embodiments of the present invention. The above-mentioned series of processes can be embodied by hardware, or by software, or by a combination thereof. When the processes are performed by software, a computer program is installed and executed in a memory of a computer assembled into dedicated hardware. Alternatively, the computer program may be installed and executed in a general-purpose computer capable of various processes.

A CPU (Central Processing Unit) 902 performs various processes in accordance with computer programs stored in a ROM (Read Only Memory) 904.

The computer programs executed by the CPU 902 or data used therein are properly stored in a RAM (Random Access Memory) 906. The CPU 906, the ROM 904, and the RAM 906 are connected to each other via a bus 910. Also coupled to bus 910, and operatively coupled to RAM 906, ROM 904 and CPU 902 are storage modules 500, 600, 700 and 800, which may be used to store processing steps or algorithms, as described herein in relation to FIGS. 5, 6, 7 and 8, respectively. These modules 500, 600, 700 and 800 may be memory registers, RAM, ROM, EEPROM or other non-transitory computer readable media adapted to store data. These modules, when operating in conjunction with CPU 902 may process the data stored therein. Each module 500, 600, 700 and 800 may be considered a storage/processing facility for purposes of understanding the embodiments of the present invention.

An input and output interface unit 912 is connected to the CPU 902 via the bus 910. A user interface unit 914 such as a graphical user interface, touch panel, and an input unit 916, such as a keyboard, a mouse, and a microphone, for inputting an image signal, and an output unit 918 including a display are connected to the input and output interface 912. The CPU 902 performs various processes using image signals input from the input unit 916 in response to commands input from the user interface unit 914. The CPU 3461 outputs the processing results to the output unit 918.

The storage unit 920 is connected to the input and output interface unit 912 and includes, for example, a hard disk and stores computer programs executed by the CPU 902 or various data. A communication unit 919 communicates with an external device via a network such as the Internet or a local area network or a wired or wireless communication medium such as digital broadcast.

When a removable medium 930 is mounted, a drive 922 drives the removable medium and acquires stored computer programs or data stored therein. The acquired computer programs or data are transmitted to the ROM 904, the RAM 906 or the storage unit 920, if desired, or may be transmitted to storage modules 500, 600, 700 and/or 800.

The computer programs, described herein may be stored in advance, for example, in a hard disk or a ROM (Read Only Memory). Alternatively, the computer programs may be stored (recorded) temporarily or permanently in a medium, such as the removable medium 930 which may be, for example, a flexible disk, a CD-ROM (Compact Disc Read Only Memory), a MO (Magneto-Optical) disc, a DVD (Digital Versatile Disc), a magnetic disk, and a semiconductor memory, and may be read by the drive 922. The computer programs may be transmitted to a computer from a download site by wireless or may be transmitted to the computer via a network such as a LAN (Local Area Network) or the Internet by wire. The computer may receive the computer programs transmitted via the communication unit 919 and install the received computer programs in a recording medium such as a built-in hard disk.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A system comprising:
a memory device that receives a plurality of first program code, each first program code utilizing a descriptive programming language, the first program code defining one or more classes, the definition including a name of the class and the attributes of the class;
an intermediate code generator that generates an intermediate representation in low-level code of the descriptive programming language of the first program code, wherein the intermediate representation having a header file for each class, the header file containing transcoding of the first program such that each class becomes an intermediate structure that contains the fields and first program array forms become pointers to transformed payloads, along with a counter variable;
a code generator that generates a second program code from the intermediate representation and utilizes a procedural programming language based on selected one or more of the first program code;
a conditioning unit that generates platform-specific runtime data associated with the first program code used in the code generator; and
a terminal having a processor that executes the second program code and the platform-specific runtime data to produce output data.

2. The system according to claim 1, wherein the descriptive programming language includes C-sharp (C#), or Java.

3. The system according to claim 1, wherein the procedural programming language includes C or C++.

4. The system according to claim 1, wherein the code generator is implemented by the descriptive programming language.

5. The system according to claim 1, wherein the code generator generates the second program code using an introspection function of the descriptive programming language.

6. The system according to claim 1, wherein the code generator generates the second program code using a reflection function of the descriptive programming language.

7. The system according to claim 1, wherein the code generator transcodes each class used in the first program code into a structure in the second program code according to a predetermined conversion.

8. The system according to claim 1, wherein the second program code includes read-only data.

9. The system according to claim 1, wherein the conditioning unit includes a conditioning instance module.

10. The system according to claim 1, further comprising a memory image generator.

11. The system according to claim 10, wherein the memory image generator receives conditioned data from the conditioning unit and generates a memory image according to a platform of the terminal.

12. The system according to claim 10, wherein the memory image includes binary data.

13. The system according to claim 1, wherein the conditioning unit conditions a plurality of assets for a game.

14. The system according to claim 13, wherein the conditioning unit conditions tool data for the game.

15. The system according to claim 1, wherein the code generator and the conditioning unit implement functions using C# language.

16. The system according to claim 1, wherein the terminal includes a PlayStation-Portable (PSP) device or a PlayStation3 (PS3) device.

17. A process for transcoding data comprising:
receiving a plurality of first program code, each first program code utilizing a descriptive programming language, the first program code defining one or more classes, the definition including a name of the class and the attributes of the class;
generating an intermediate representation in low-level code of the descriptive programming language of the first program code, wherein the intermediate representation is based on each class and each field in the first program code, the intermediate representation having a header file for each class, the header file containing transcoding of the first program such that each class becomes an intermediate structure that contains the fields and first program array forms become pointers to transformed payloads, along with a counter variable;
generating a second program code from the intermediate representation and utilizing a procedural programming language based on selected one or more of the first program code;
generating platform-specific runtime data associated with the first program code; and
executing the second program code and the platform-specific runtime data to produce output data.

18. The product of the process of claim 17 stored in a computer readable memory.

19. A method for transcoding data comprising:
receiving a plurality of first program code, each first program code utilizing a descriptive programming language, the first program code defining one or more classes, the definition including a name of the class and the attributes of the class;
generating an intermediate representation in low-level code of the descriptive programming language of the first program code, wherein the intermediate representation is based on each class and each field in the first program code, the intermediate representation having a header file for each class, the header file containing transcoding of the first program such that each class becomes an intermediate structure that contains the fields and first program array forms become pointers to transformed payloads, along with a counter variable;

generating a second program code that utilizes a procedural programming language based on selected one or more of the first program code;

generating platform-specific runtime data associated with the first program code; and executing the second program code and the platform-specific runtime data to produce output data.

20. The method as claimed in claim 19, wherein the descriptive programming language includes C-sharp (C#), or Java.

21. The method as claimed in claim 19, wherein the procedural programming language includes C or C++.

22. The method as claimed in claim 19, wherein the second program code uses an introspection function of the descriptive programming language.

23. The method as claimed in claim 19, wherein the second program code uses a reflection function of the descriptive programming language.

24. The method as claimed in claim 19 further comprising:
transcoding each class used in the first program code into a structure in the second program code according to a predetermined conversion.

25. The method as claimed in claim 19, further comprising:
receiving conditioned data; and
generating a memory image according to a desired platform.

26. A non-transitory computer readable medium storing program code that when executed by a processor, performs the steps of:
receiving a plurality of first program code, each first program code utilizing a descriptive programming language, the first program code defining one or more classes, the definition including a name of the class and the attributes of the class;
generating an intermediate representation in low-level code of the descriptive programming language of the first program code, wherein the intermediate representation is based on each class and each field in the first program code, the intermediate representation having a header file for each class, the header file containing transcoding of the first program such that each class becomes an intermediate structure that contains the fields and first program array forms become pointers to transformed payloads, along with a counter variable;
generating a second program code from the intermediate representation utilizing a procedural programming language based on selected one or more of the first program code;
generating platform-specific runtime data associated with the first program code; and
executing the second program code and the platform-specific runtime data to produce output data.

27. The program code as claimed in claim 26, wherein the descriptive programming language includes C-sharp (C#), or Java.

28. The program code as claimed in claim 26, wherein the procedural programming language includes C or C++.

29. The program code as claimed in claim 26, wherein the second program code uses an introspection function of the descriptive programming language.

30. The program code as claimed in claim 26, wherein the second program code uses a reflection function of the descriptive programming language.

31. The program code as claimed in claim 26 further comprising program code for:
transcoding each class used in the first program code into a structure in the second program code according to a predetermined conversion.

32. The program code as claimed in claim 26, further comprising program code for:
receiving conditioned data; and
generating a memory image according to a desired platform.

* * * * *